Figure 4:
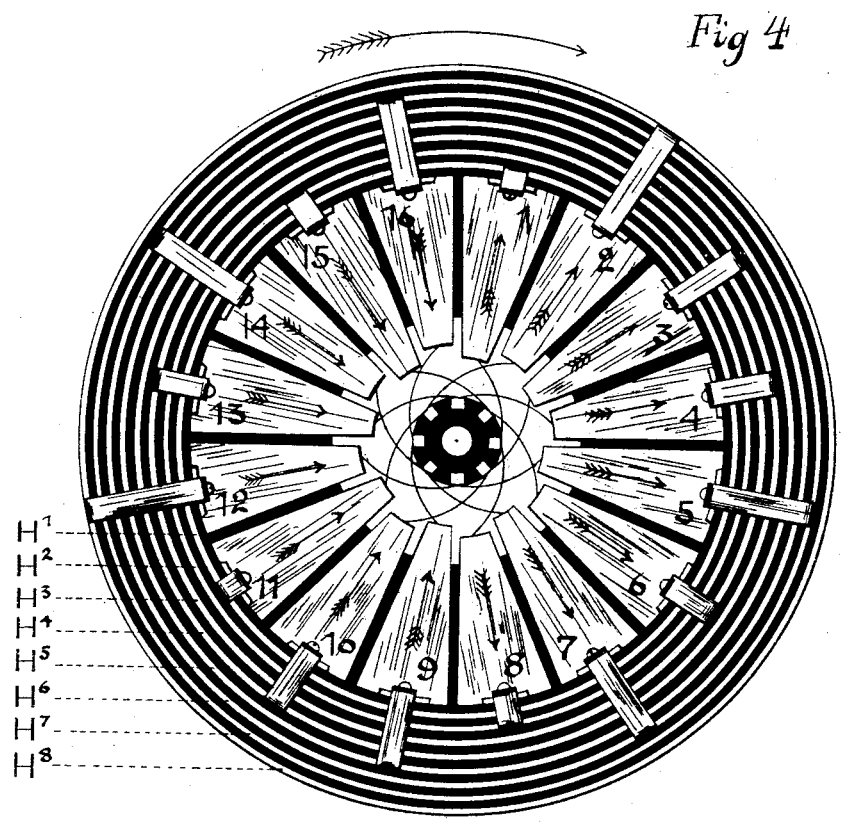

(No Model.) 2 Sheets—Sheet 1.
T. A. EDISON.
MAGNETO OR DYNAMO ELECTRIC MACHINE.
No. 263,143. Patented Aug. 22, 1882.
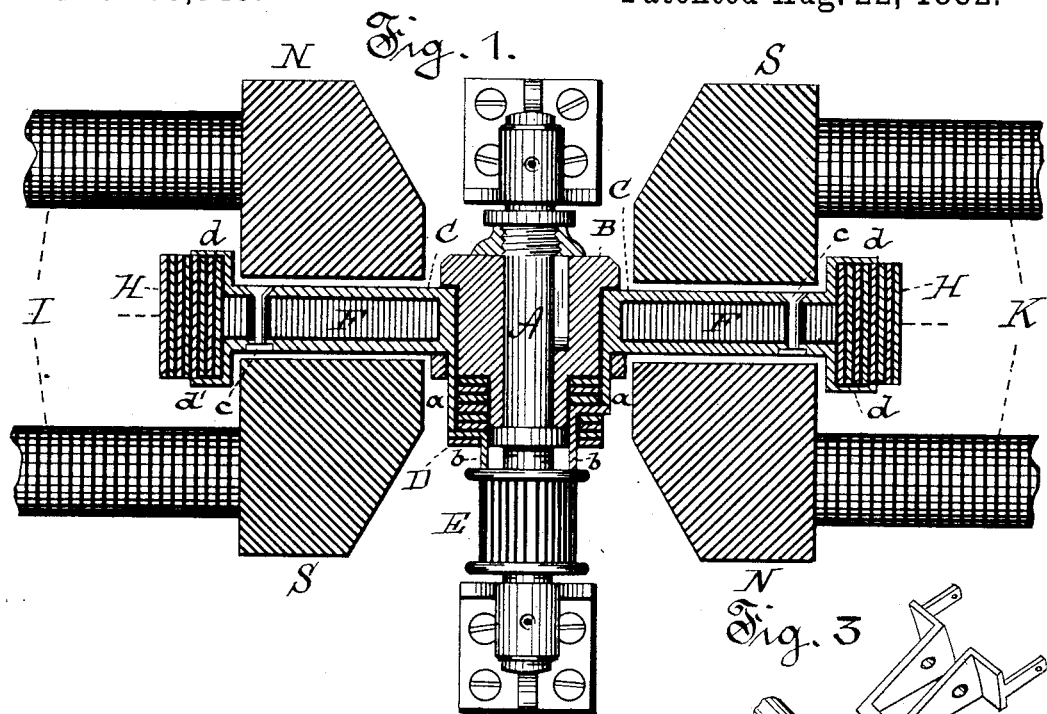
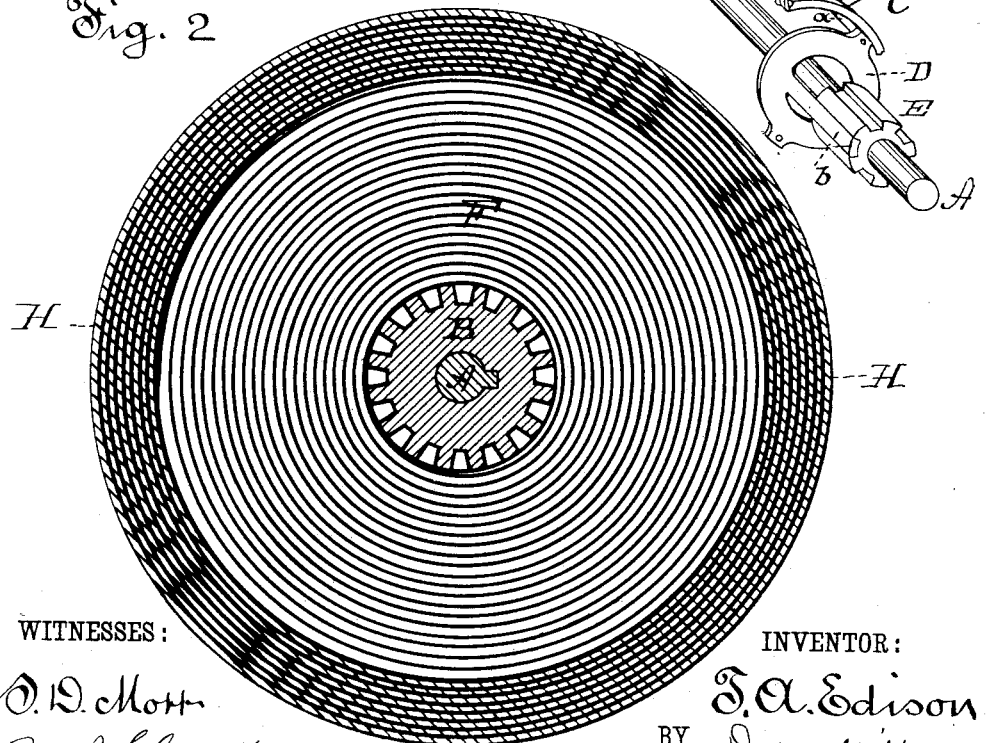
WITNESSES:
O. D. Mott
Jno. F. Clagett.
INVENTOR:
T. A. Edison
BY Dyer & Wilber
ATTORNEYS.

(No Model.)

T. A. EDISON.

MAGNETO OR DYNAMO ELECTRIC MACHINE.

No. 263,143.   Patented Aug. 22, 1882.

2 Sheets—Sheet 2.

WITNESSES:
O. D. Mott
F. H. Hall

INVENTOR:
T. A. Edison
BY L. F. Millar
ATTORNEYS.

UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

MAGNETO OR DYNAMO ELECTRIC MACHINE.

SPECIFICATION forming part of Letters Patent No. 263,143, dated August 22, 1882.

Application filed August 30, 1881. (No model.)

*To all whom it may concern:*

Be it known that I, THOMAS A. EDISON, of Menlo Park, in the county of Middlesex and State of New Jersey, have invented a new and useful Improvement in Magneto or Dynamo Electric Machines or Electric Engines, (Case No. 334;) and I do hereby declare that the following is a full and exact description of the same, reference being had to the accompanying drawings, and to the letters of reference marked thereon.

The object I have in view is to produce a dynamo or magneto electric machine the armature of which will be in the form of a disk, which armature will be stiff and strong, will not heat in its core in use, will permit the bringing of the polar extensions of the magnet or magnets close together, so as to form an intense magnetic field, and in which machine the inductive bars of the armature will be connected to generate a continuous current in one direction of high electro-motive force, and will further be connected with the commutator-bars and with each other in multiple arc in order to reduce to the minimum the internal resistance of the machine.

In carrying out my invention I make the naked copper inductive bars double or in two parts, connected together at their inner ends, and having offset-arms at their outer ends for connecting with the surrounding concentric rings. A number of these double radial bars are arranged in the form of a disk and secured to a suitable hub, the bars being insulated both from the hub and from each other. At their inner ends the double bars are connected to insulated metal disks, (the nearly-opposite double bars being connected in pairs by the disks,) and the disks have tongues which make connection with or form the bars of the commutator-cylinder. The core of the armature is constructed by winding strips of iron and paper together, in spiral form, between such double bars, such core preventing the circulation of magnetic currents therein and the loss of energy caused by the generation of heat in such core. The effect is assisted by the fact that the iron portion of the core does not cut the lines of force at right angles. The polar extensions of two electro-magnets are arranged on each side of the disk-armature. Outside of the polar extensions the terminal double bar of each connected pair of double bars is connected with the initial double bar of another pair by concentric rings which are nearly outside the magnetic field and do not cut the lines of force at right angles.

The construction is also well adapted for electro-motors, and, whether as a motor or electrical generator, it has the advantage of great lateral compactness.

In the drawings, Figure 1 is a horizontal section of the machine, the commutator brushes or springs being omitted, and the magnets being broken away; Fig. 2, a vertical section of the armature; Fig. 3, a separate perspective view of one of the double inductive bars and its commutator-connection, and Fig. 4 a side elevation of the armature.

A is the shaft journaled in suitable bearings.

B is the hub suitably secured to the shaft, and having attached to it the double inductive bars C, of naked copper. These bars are connected at their inner ends, and are insulated from the hub and from each other. The bars C have projecting conductors $a$ extending to insulated metal disks D. The bars C are connected in pairs with the bars nearest a diametrically-opposite position, and each disk has a tongue, $b$, which is connected with or forms one of the bars of the commutator-cylinder E. For ease of illustration only two of such tongues are shown in Fig. 1. The core F of the armature is made by winding spirally together strips of iron and paper. Bolts $c$ may be employed to assist in securing the bars and core together. The double bars C have offset-arms $d$ for making connection with the concentric rings H, which surround the core. Each ring connects the terminal bar of one pair of connected opposite double bars with the initial bar of another pair. Hence there are half as many rings as bars. The polar extensions N S of the electro-magnets I K are brought close up to the inductive bars.

I do not claim in this application the beveled polar extensions shown in Fig. 1, for the reason that I intend to make separate application for Letters Patent thereon.

The bars are connected in the same manner as described in an application for patent already filed by me on an electrical generator or engine having a coreless disk-armature divided into radial sections, the path of the current being as follows—see Fig. 4: one portion of the current will pass from the negative to the positive commutator-brush via 1, H′, 11, 2, H⁸, 12, 5, H⁷, 14, 7, H⁶, and 16, and the other portion via 8, H², 15, 6, H³, 13, 4, H⁴, 10, 3, H⁵, and 9.

What I claim is—

1. A dynamo or magneto electric machine or electric engine having an armature of disk form, constructed of a core, upon which are secured radiating copper inductive bars, with concentric rings, for making the external connections between said bars, substantially as set forth.

2. A dynamo or magneto electric machine or electric engine having a disk-armature constructed of an iron core and radial copper inductive bars, said inductive bars being connected in pairs together, and with the commutator-bars at their inner ends, and the terminal and initial inductive bars of the pairs being connected at their outer ends so as to form a closed circuit, substantially as set forth.

3. In a dynamo or magneto electric machine or electric engine, the combination of the disk-armature core, the double radial copper bars connected in pairs together, and with the commutator-bars at their inner ends, and the concentric rings for connecting the terminal and initial bars of the pairs at their outer ends, substantially as set forth.

4. In a dynamo or magneto electric machine or electric engine, the disk-armature core composed of spirally-wound strips of metal and insulating material, substantially as set forth.

This specification signed and witnessed this 24th day of June, 1881.

THOS. A. EDISON.

Witnesses:
RICHD. N. DYER,
WM. H. MEADOWCROFT.